Aug. 17, 1965  S. FORSHEE  3,201,272
METHOD AND MEANS FOR TRAPPING AND RECLAIMING PORCELAIN FRIT
Filed Nov. 24, 1961  2 Sheets-Sheet 2

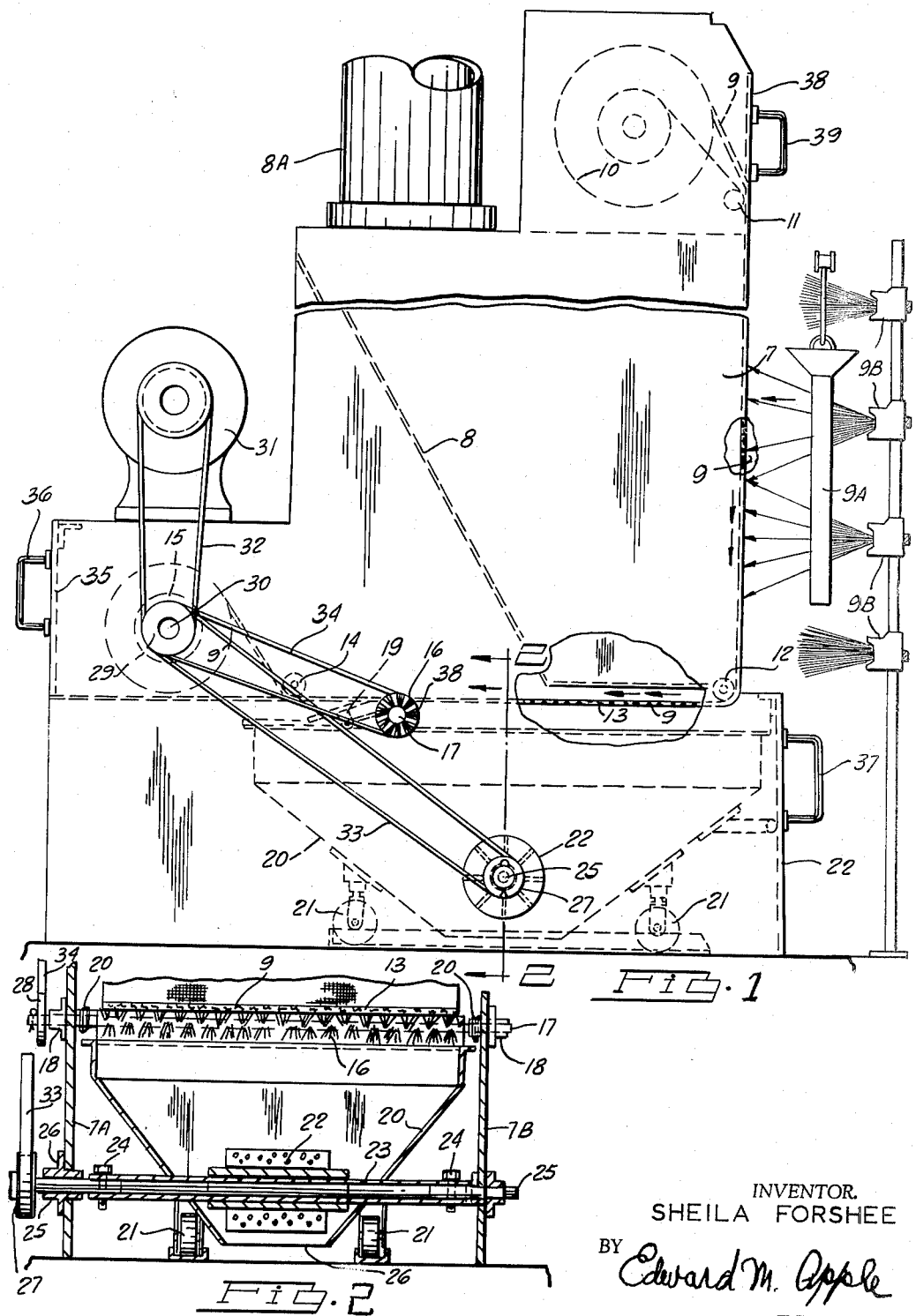

INVENTOR.
SHEILA FORSHEE
BY Edward M. Apple
ATTORNEY

United States Patent Office 3,201,272
Patented Aug. 17, 1965

3,201,272
METHOD AND MEANS FOR TRAPPING AND RECLAIMING PORCELAIN FRIT
Sheila Forshee, 1410 Iroquois, Detroit 14, Mich.
Filed Nov. 24, 1961, Ser. No. 154,715
10 Claims. (Cl. 117—102)

This invention relates to the art of porcelainizing manufactured objects, such as refrigerators, stoves, bath tubs and the like, wherein a porcelain or ceramic finish is applied to said objects by means of spray guns, jets or the like.

An object of the invention is to provide a novel method and means for trapping and reclaiming the porcelain or ceramic frit used in such operations.

Heretofore industry has employed various means, including sediment tanks, staggered perforated baffles or the like, to prevent the non-adhering particles of frit from entering the exhaust system and escaping to the atmosphere, or re-entering and lodging in the fresh air supply system. With previous methods, the overspray remained for long periods in a wet, cement-like condition on the baffles, collection pans and adjacent areas, and it became so contaminated with floor dust and dirt that it could not be re-used. Further than that, constant and expensive cleaning operations were required to keep the equipment in working order, and up to the present time no means were known which would return the frit to its originally dry condition, so that it could be remixed and made available for re-use in spraying.

It is, therefore, an object of this invention to obviate the foregoing difficulties and to provide means and an economical and efficient method, whereby the excess frit can be trapped and reclaimed for re-use.

Another object of the invention is to provide means for containing the overspray and preventing it from accumulating on inaccessible parts in wet cement-like condition.

Another object of the invention is to provide means for absorbing the moisture of the overspray and dry trapping the frit, so that the latter may be reclaimed for future use.

Another object of the invention is to provide a method and means whereby the frit of the overspray in an operation of the character indicated, may be trapped and reclaimed in its original or treated, color condition.

A further object of the invention is to provide a disposable curtain for trapping the oversprayed frit, which permits air passage therethrough for proper exhaust, has sufficient absorption characteristics to remove the moisture, has a surface which permits the impingement of the frit, and has a tensile strength sufficient to support the weight of the impinged frit.

Another object of the invention is to provide a disposable medium for receiving the oversprayed frit, with means to dry the frit and means to remove the frit from the fabric medium and collect it for re-use.

The foregoing and other objects and the advantages of the invention will become more apparent as the description proceeds, reference being made from time to time to the accompanying drawing, forming part of the within disclosure, in which drawing:

FIG. 1 is a fragmentary side elevational view, with parts broken away, of a device embodying the invention.

FIG. 2 is a vertical section taken substantially on the line 2—2 of FIG. 1.

Figure 3:
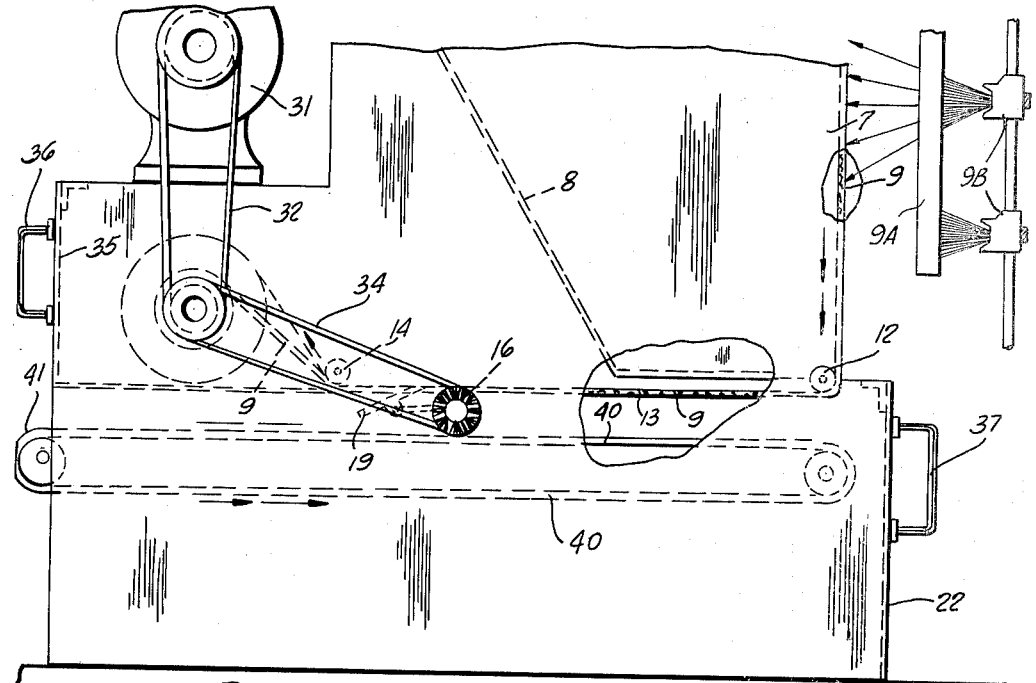
FIG. 3 is a fragmentary side elevational view, with parts broken away, illustrating a modified form of the device.

Referring now more particularly to the drawings, it will be understood, that in the embodiment herein disclosed the reference character 7 indicates the housing of a spray booth, similar in construction to the spray booths disclosed in my previously issued United States Letters Patent No. 2,841,073 and No. 2,875,680. In this embodiment, a compartment is defined by the upper, lower and side walls of the housing 7, a rear wall 8 and a disposable front wall 9, made of a curtain media as hereinafter described. The interior of the housing 7 is ventilated with an exhaust stack 8A. The curtain media 9 may be a non-woven fabric material, such as disclosed in my previous patents, or any type of material suitable for the purposes intended, whether the material be a woven, or non-woven fabric, Fiberglas, paper, or any other material, which may be disposed of in practicing the process herein disclosed. In this disclosure, and in the appended claims, I do not intend to be limited to the specific material, which I disclosed in my previous patents. However, that material may be used with highly satisfactory results in practicing the process herein disclosed. The work piece to be porcelainized is indicated by the reference character 9A, and the applicators are indicated by the reference character 9B.

The curtain material, or media 9, is preferably carried at the top of the spray booth housing 7 on a roll 10 and is fed over an idler roller 11 and extends downwardly to form the front wall of the spray booth 7, in much the same manner as disclosed in my previous patents. In this embodiment however, the curtain material, or media, 9, passes over another idler roller 12 and extends rearwardly, as at 13, and then passes over a third idler roller 14, and is then picked up by a collector roll 15. The rolls and rollers 10, 11, 12 and 14 are preferably carried by suitable shafts, which are supported in any suitable manner by the side walls of the housing 7.

In this embodiment of the invention and in the instant process, the return portion 13 of the curtain media 9, provides a drying area for the surplus porcelain or ceramic frit, which has previously impinged upon the back drop curtain media 9, in the area between the idler roller 11 and the idler roller 12, during the spraying or gunning operation. It will be understood that the excess frit which accumulates on the curtain media 9, during the spraying operation, is carried on the outside of the curtain media 9 until it reaches the brush 16, which is mounted near the rear of the housing 7 and is arranged for rotation with the shaft 17 (FIG. 2), which is supported in suitable bearings 18, which in turn are supported by the side walls 7A and 7B of the housing 7. The brush 16 is a rotary brush preferably consisting of a plurality of soft nylon fibers, or other suitable material, which will contact the media 9 and gently remove from the outside surface of the curtain media 9, the frit which has impinged thereon during the spraying operation. Although I have herein disclosed a soft rotating brush action for the removal of the porcelain particles from the return portion 13 of the curtain 9, it will be understood that I may also remove the porcelain particles from the curtain by an intermittent tapping or vibrating of the curtain, or by other means positioned adjacent to the return area 13 of the curtain media 9. For example, by a scraper, such as indicated at 19, or other suitable means. In this embodiment the scraper 19 is mounted, at each end, on spring-backed brackets 20, which brackets 20 are loosely mounted on the brush shaft 17 and are arranged to exert a slight pressure on the scraper to force it against the underside of the return portion 13, of the curtain media 9.

The porcelain frit which is removed from the underside of the return portion 13 of the curtain media 9, is preferably dropped into a container 20, which is made of metal, or other suitable material. The container 20 may be of any desired shape, such as shown in FIG. 2, and may be supported on rollers 21, or other suitable means, whereby it may be removed from the bottom of the housing 7 through the door 22 (FIG. 1). The container 20 is provided with an agitator 22 (FIG. 2) which is intended to agitate the frit and prevent it from solidifying into a heavy mass, if such tendency is indicated. The agitator 22 is mounted on a tubular member 23, which is connected by pins 24 to stub shafts 25, which may rotate in suitable bearings 26, supported by the side walls of the housing 7, as shown in FIG. 2. When it is desired to remove the container 20 it is only necessary to pull the pins 24 and remove the stub shafts 25. The bottom of the container 20 is provided with an opening 26, which is preferably provided with a removable cover (not shown).

The brush shaft 17 and the stub shafts 25 are rotated by suitable pulleys 27 and 28, which in turn are rotated by a pulley 29 carried on the shaft 30 of the roll 15. The pulley 29 is driven by another pulley 29A, which in turn is driven by a motor 31, which is mounted on top of an offset portion of the housing 7. The motor 31 drives the pulley 29 on the shaft 30 by means of a belt 32 and the pulleys on the shaft 30 in turn drive pulleys 27 and 28 by means of the belts 33 and 34. Although I have shown in this embodiment pulleys and V belts, it will be understood that sprockets and chains may be substituted therefor.

The used portions of the curtain media 9, which are collected on the roll 15, may be disposed of through a door 35 having a handle 36. It will be understood that the door 22 is also provided with a handle 37, and the compartment housing the roll 10 is also provided with a door 38, having a handle 39, so that a fresh roll of curtain media 9 may be installed in the device.

The excess frit which is collected in the container 20 is free of dust and dirt and other contaminants and is now comparatively dry and in such a reclaimed condition that it may be re-used immediately. Different collecting containers 20 may be employed for different color applications.

In FIG. 3, I show a modified form of device in which an endless belt 40 is employed to carry the frit to a position outside of the housing 7, as at 41, after the frit has been brushed or otherwise removed from the underside of the curtain media 9. At position 41 the reclaimed frit is ready for re-use.

Figure 4:
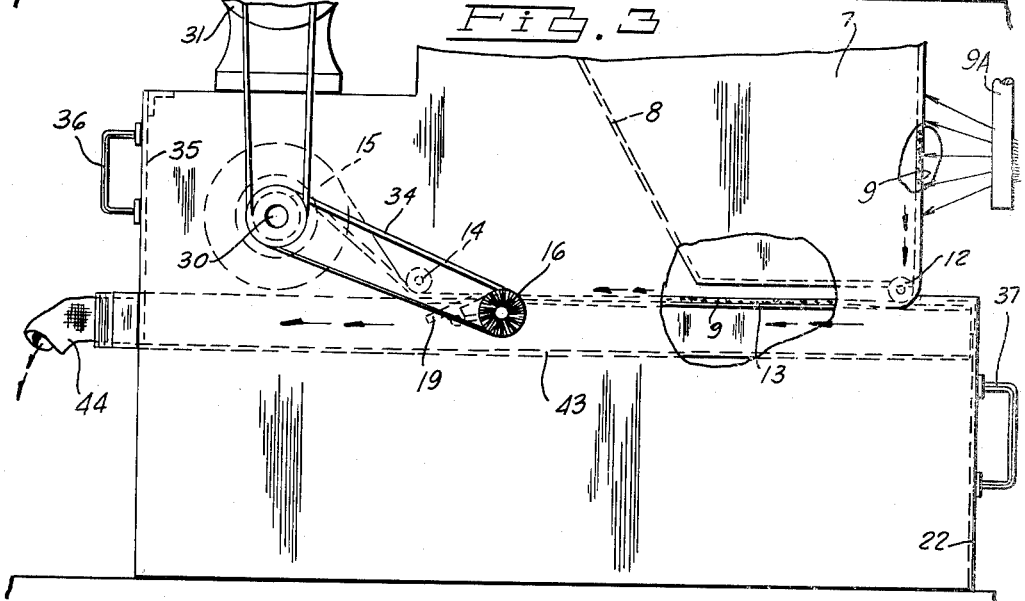
FIG. 4 is a fragmentary side elevational view, with parts broken away, of a still further modified form of the device embodying the invention.

In FIG. 4, I show a further modified form of the invention herein. A suction device 43 is used to remove the frit from the housing after it has been dislodged from the underside of the media 9. In this embodiment, the member 43, takes the form of an enclosure which envelops the brush 16, which is connected as at 44, with a suitable source of vacuum power. In other respects the structure functions as previously described. Of course, in the modified forms shown in FIGS. 3 and 4, the container or hopper 20, shown in FIGS. 1 and 2 is dispensed with.

Although I have illustrated the return portion 13 of the curtain media 9 as lying in a horizontal plane, it will be understood that the process of reclaiming the frit may also be practiced if that portion of the curtain were positioned in a vertical, or other angular plane.

It is also within the contemplation of the invention to trap the frit on a curtain media 9, which may be endless, instead of as shown in FIG. 1.

It is believed that the operation of the device and the process is obvious from the foregoing description.

Having described my invention, what I claim and desire to secure by Letters Patent is:

1. A continuous process of trapping and reclaiming porcelain frit which consists of the steps of providing a spray booth having one wall formed of a curtain of highly absorbent, air permeable media of high tensile strength, positioning an article to be porcelainized in said booth in front of said curtain wall, applying wet porcelain frit to said article in such manner that surplus porcelain frit is deposited on an exposed area of said curtain wall, moving the exposed area of said curtain to a drying station, drying the surplus frit on said previously exposed area and then removing said dried surplus frit from said dried curtain area for re-use.

2. The process of claim 1, including the further step of disposing of said exposed area of said curtain after the surplus frit has been dried and removed therefrom.

3. The process of claim 1, in which the dried surplus frit is removed from said previously exposed curtain area by means of suction.

4. The process of claim 1, including a step in which the dried surplus frit is transported from the station of removal to a station of reclamation.

5. A device for trapping and reclaiming surplus porcelain frit which comprises a spray booth having an air plenum and exhaust stack, an air permeable, highly absorbent curtain of high tensile strength forming a front wall of said booth and positioned ahead of said plenum and stack and arranged to receive air and frit from an applicator, said curtain having an internal rearwardly directed extension which serves as a drying station, means to advance the curtain from the applicator to the drying station, means to remove frit from said drying station and means to collect the curtain extension after said frit is removed therefrom.

6. The structure of claim 5, including means associated with said curtain extension for conveying the frit removed from said curtain extension to a reclamation station.

7. The structure of claim 5, in which the said frit removal means include a suction system.

8. The structure of claim 5, in which said curtain extension and drying station is angularly positioned with respect to said curtain.

9. The structure of claim 5, in which said frit removal means comprises at least one element which contacts the bottom face of said curtain extension.

10. The structure of claim 5, in which said frit removal means comprises a power driven rotating element which contacts the bottom face of said curtain extension.

References Cited by the Examiner

UNITED STATES PATENTS

| 821,776 | 5/06 | Zoller. |
| 1,529,134 | 3/25 | Kelter. |
| 2,106,187 | 1/38 | Naugler _____ 118—326 XR |
| 2,486,877 | 11/49 | Ransburg et al. ____ 118—326 XR |
| 2,509,276 | 5/50 | Ransburg et al. _____ 118—628 |
| 2,752,003 | 6/56 | Hersey et al. _____ 98—115 |
| 2,795,516 | 6/57 | Miller _____ 118—626 XR |
| 2,841,073 | 7/58 | Forshee _____ 98—115 |
| 2,875,680 | 3/59 | Forshee _____ 98—115 |
| 2,897,743 | 8/59 | Marantz _____ 118—326 X |

FOREIGN PATENTS

| 828,032 | 1/52 | Germany. |

RICHARD D. NEVIUS, *Primary Examiner.*